Dec. 11, 1962   J. H. ALOWAY   3,068,449
SIGNAL DEVICE FOR VEHICLES
Filed April 14, 1961
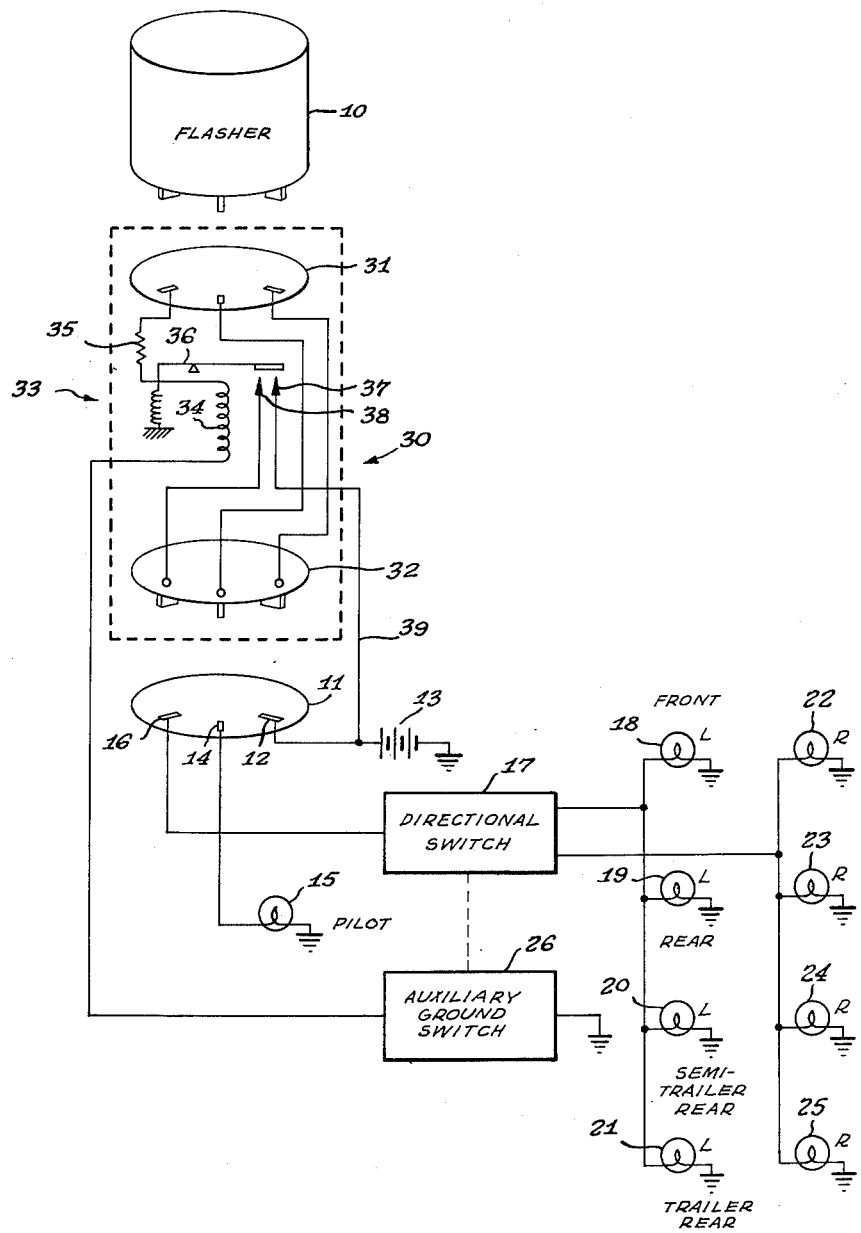
*Inventor*
Joseph H. Aloway
BY Edward L. Amonette
*Agent*

3,068,449
SIGNAL DEVICE FOR VEHICLES
Joseph H. Aloway, Box 49, Socorro, N. Mex.
Filed Apr. 14, 1961, Ser. No. 103,085
2 Claims. (Cl. 340—73)

My invention relates to signal devices for vehicles, and more particularly to those used for indication of change of direction of the vehicle.

Directional signal devices now in common use in motor vehicles include signal lights placed at the right and left sides at the front and rear of the vehicle. These lights are flashed on and off by a flasher when it is placed into operation by means of a directional switch usually mounted on the steering column of the vehicle and operated by the motor vehicle operator. The usual switch has a stick extending therefrom which is normally in a neutral position in which none of the directional lights are operated. When it is desired to indicate a change of direction of the vehicle the operator moves the stick to one of two alternative positions, one position connecting the lights on the left side of the vehicle to the flasher and coincidentally energizing the flasher, so that those lights are flashed on and off, indicating a left turn. The other position of the switch connects the lights on the right side of the vehicle to the energized flasher so that they are flashed on and off to signal a right turn.

The directional signal device is designed for a normal load consisting of the lights originally installed in the vehicle, and the flasher is so designed that the flash rate is dependent upon the load. Usually, a decrease in load such as is encountered when one of the directional lights burns out causes the flasher to operate at an abnormally fast rate so that the remaining light or lights on that side of the vehicle flash so quickly that to the human eye they appear to be burning continuously. Contrariwise, if the load on the flasher is increased such as by connecting into the signal device additional directional lights mounted on a trailer pulled by the vehicle, the flash rate is severely decreased so that an observer might glance at the turn lights during the off portion of their cycle and think that they were not operating. This is an unsafe condition, since the vehicle might begin its turn in front of the vehicle of the observer when the observer, thinking that no turn was intended, is attempting to pass the first vehicle. Some trailer owners have attempted to remedy the situation by disconnecting the tail lights of their vehicle and adding the additional load of the trailer signal lights. This also is unsafe, for obvious reasons.

An additional disadvantage of present directional signal devices is that the flasher is not designed to carry a very heavy load so that it is quite possible to burn out the flasher by adding too many directional lights. Accessories are now available for adapting conventional installations for operation of all directional lights at once to indicate danger or emergency. This, also overloads the conventional circuit, causing malfunction or failure.

By using my invention an existing directional signal device is easily adapted to carry considerable additional load without change in the flash rate and without overloading the flasher. Also, reduction of load will not alter the flash rate. Briefly, I have provided in a simple plug-in device isolation between the flasher and the directional load so that the flasher will operate at its normal design flash rate regardless of the load it is controlling. My device is installed simply by removing the flasher from its socket, plugging in my invention in its place, and inserting the flasher into a receptacle provided therefor in my invention. Then a wire is connected from my invention to an auxiliary ground switch preferably controlled by the directional switch of the original signal device; and another wire is connected to the vehicle battery. Thus, when the original directional switch is operated it connects the appropriate signal lights into the output circuit of my invention and at the same time operates the auxiliary switch which completes the circuit including the input circuit of my invention and the flasher, so that the flasher operates the correct directional lights through the intermediate isolation means of my invention.

A better understanding of my invention may be had by reading the more detailed description to follow in conjunction with the claims and the attached drawing which shows a preferred embodiment of my invention.

Referring now to the drawing, flasher 10 is shown as the usual male plug-in unit, separated from the conventional receptacle 11 which is installed in the vehicle with pin 12 connected to one side of battery 13, the other side of which is grounded; pin 14 connected to one side of pilot light 15, the other side of which is grounded; and pin 16 connected to directional switch 17.

As explained above, manual operation of directional switch 17 connects either the lefthand set of directional lights 18, 19, 20 and 21, or the righthand set of directional lights 22, 23, 24 and 25 to flasher 10, depending upon which direction the switch is operated. Directional lights 18, 19, 22 and 23 are mounted on the vehicle, while lights 20, 21, 24 and 25 may be mounted on the rear of trailers towed by the vehicle.

Auxiliary ground switch 26 is shown mechanically connected to directional switch 17 so that manual operation of the directional switch in either direction will close the auxiliary switch.

The isolation portion 30 of my invention is shown interposed between flasher 10 and its receptacle 11, but exploded therefrom for clarity. Receptacle 31 is similar to receptacle 11 and is made to receive flasher 10. Male plug-in means 32 is similar to the male portion of flasher 10 and plugs into receptacle 11 in place of the flasher. Between members 31 and 32 is located relay 33 and its associated wiring. The relay is one of a broad family of control means having an input circuit isolated from and controlling an output circuit, commonly used to control a large amount of electrical power with a small amount. The input circuit of the relay includes coil 34 in series with optional resistor 35 which may be necessary to form a load impedance sufficiently similar to the design load impedance of flasher 10 to maintain normal operation of the flasher. The input circuit of the relay is connected in series with flasher 10 and auxiliary ground switch 26. Power is furnished to the flasher, as it would be in the absence of my invention, from battery 13 by means of pin 12 in receptacle 11. In my invention wiring connects the appropriate pin of the flasher with pin 12 of receptacle 11. When auxiliary ground switch 26 is closed, the circuit is completed through the flasher from ground to battery 13 through pin 12 through the flasher, through the input circuit of relay 30, and through switch 26 to ground. Thus, the flasher begins operation opening and closing contacts within itself which open and close the circuit just described. When the circuit is closed, coil 34 is energized thereby attracting armature 36 and electrically connecting contacts 37 and 38.

Contact 37 is connected by wire 39 to battery 13 so that when armature 36 connects contact 37 to contact 38, battery voltage is furnished to contact 38. This voltage is carried by means of pin 16 of receptacle 11 and associated wiring through directional switch 17 to the appropriate set of directional lights as chosen by the direction of the switch.

Pilot light 15 operates as it would in the absence of my invention, wiring being furnished within my invention to continue the usual connections to flasher 10. When only one pilot is used, as shown in the drawing, it flashes to indicate operation of directional lights 18–23.

Other types of directional signal devices utilize two pilot lights which may be connected in parallel with the appropriate left and righthand sets of directional lights to give a directional as well as an operational indication to the operator. Slight changes in the circuitry shown will take care of this kind of installation without departing from my invention.

If, for the moment, isolation means 30 and auxiliary ground switch 26 are removed from the circuit it is seen that flasher 10 operates with the remaining circuitry directly controlling the flashing of the directional lights, except that in a normal installation lights 20, 21, 24 and 25 would not be included, and if added would interfere markedly with normal operation of the flasher by changing its normal flash rate and possibly by burning out the flasher due to excess electrical load.

Interposition of isolation means 30 and the addition of auxiliary ground switch 26 are seen to isolate the flasher 10 from the directional load comprising pilot light 15 and either the lefthand set of directional lights 18–21 or the righthand set 22–25. It is obvious that, since the flash rate of flasher 10 is controlled by its load consisting of the constant-impedance input circuit of relay 33, the directional load may be increased or decreased without changing the flash rate. The only limitation on the extent of the directional load is the current carrying capacity of contacts 37 and 38 and armature 36, together with associated wiring. The capacity of these elements is easily and economically made sufficiently large to allow for any possible normal additions to the original directional load, including simultaneous operation of all directional lights.

Auxiliary ground switch 26 may be of several types, and may or may not be operated by movement of directional switch 17. One possibility is the mounting of a switch on the steering column with appropriate activating members which will be actuated by movement of the stick of directional switch 17. If this is not desirable, the interior of directional switch 17, contained within the steering column, may be modified in several ways to ground the incoming lead of switch 24 when the stick of directional switch 17 is moved in either direction.

I have described a plug-in unit which quickly and easily converts a directional signal device having very limited load capacity into one which has almost unlimited capacity, thus making possible the additional of directional loads made necessary by the towing of a trailer by the motor vehicle containing the original signal device. The installation, including the addition of auxiliary ground switch 26 and wire 39 may be made by almost anyone having a minimum amount of capability along those lines, it usually not being necessary to employ a mechanic for the installation of my invention. Thus, persons acquiring small trailers such as camping trailers need not go to a great additional expense to furnish the trailers with directional capabilities. My invention, however, is not confined to such use and may be used equally well with tractor-trailer combinations where the number of trailer units may vary from none to several without affecting the flash rate. Although I have described a preferred embodiment of my invention in connection with one of several common directional signal devices my invention is not limited thereto, but instead the sphere and scope of my invention is described in the claims below.

I claim as my invention:

1. In a directional signal device for vehicles including a bidirectional switch and a flasher whose flash rate is dependent upon the directional electrical signal load operated thereby, means for isolating the flasher from the directional load whereby the flash rate is made independent of directional load and whereby the load capacity of the signal device is increased beyond a flasher design load, comprising: a relay having a coil impedance sufficiently similar to that of the flasher design load to maintain satisfactory flasher operation, the coil of said relay being connected to the flasher in place of the directional signal load, and said relay having electrical contacts operated by the coil; means connecting the directional signal load in series with the relay contacts; and means operable by switch closure in either direction for enregizing the relay coil and the flasher.

2. In a directional signal device for vehicles including a bidirectional switch and a male plug-in flasher whose flash rate is dependent upon a directional electrical signal load operated thereby and capable of connection thereto by means of a first receptacle, plug-in means for isolating the flasher from the directional load, comprising: male means for plugging into the first receptacle; a second receptacle for receiving the flasher; a relay having a coil impedance substantially equal to a flasher design load, the coil of said relay being connected to the second receptacle, replacing the directional signal load connections to the flasher, and the electrical contacts of said relay being connected to the male means, replacing the flasher connections to the directional signal load; and means operable by closure of the switch in either direction for energizing the relay coil and the flasher.

References Cited in the file of this patent

UNITED STATES PATENTS

| | | |
|---|---|---|
| 2,451,618 | Gross | Oct. 19, 1948 |
| 2,648,059 | Hostetter | Oct. 19, 1948 |